United States Patent [19]

Schuerfeld

[11] Patent Number: 5,716,169

[45] Date of Patent: Feb. 10, 1998

[54] PROCESS AND DEVICE FOR ADJUSTING REAMERS AND THE LIKE

[75] Inventor: Horst Schuerfeld, Bielefeld, Germany

[73] Assignee: Gildemeister-Devlieg System-Werkzeuge GmbH, Bielefeld, Germany

[21] Appl. No.: 656,313

[22] PCT Filed: Nov. 24, 1994

[86] PCT No.: PCT/EP94/03884

§ 371 Date: Jun. 12, 1996

§ 102(e) Date: Jun. 12, 1996

[87] PCT Pub. No.: WO95/16543

PCT Pub. Date: Jun. 22, 1995

[30] Foreign Application Priority Data

Dec. 18, 1993 [DE] Germany .................. 43 43 404.5

[51] Int. Cl.$^6$ ..................................... B23B 49/00
[52] U.S. Cl. ........................ 408/1 R; 408/13; 408/16
[58] Field of Search ...................... 408/1 R, 16, 8, 408/13

[56] References Cited

U.S. PATENT DOCUMENTS

| | | | |
|---|---|---|---|
| 4,400,118 | 8/1983 | Yamakage et al. | 408/13 X |
| 4,667,113 | 5/1987 | Nakajima et al. | 408/16 X |
| 4,790,694 | 12/1988 | Wilent et al. | 408/16 X |
| 4,807,145 | 2/1989 | Takahashi et al. | 408/16 X |
| 5,275,517 | 1/1994 | Turnipseed et al. | 408/16 X |
| 5,522,683 | 6/1996 | Kakimoto et al. | 408/16 X |
| 5,529,441 | 6/1996 | Kosmowski et al. | 408/16 X |

FOREIGN PATENT DOCUMENTS

| | | |
|---|---|---|
| 1379930 | 10/1964 | France . |
| 2138366 | 9/1972 | Germany . |
| 3824603 | 1/1990 | Germany . |
| 1-164539 | 6/1989 | Japan . |

*Primary Examiner*—Andrea L. Pitts
*Assistant Examiner*—Henry W. H. Tsai
*Attorney, Agent, or Firm*—Spencer & Frank

[57] ABSTRACT

A process for adjusting an effective tool diameter D and an effective tilt angle α of a cutting tool to a stipulated tool diameter and a stipulated tilt angle, respectively. The cutting tool includes a cutting blade disposed on a shaft and defining a cutting point and a cutting edge tilted by the effective tilt angle with respect to a rotational axis of the shaft, and a guide element disposed on the shaft opposite the cutting blade and defining a guide point and a guide line, the cutting point and the guide point being disposed on a cutting plane of the cutting tool. The process includes the steps of utilizing a measurement arrangement including a camera and a measurement slide supporting the camera; moving the measurement arrangement for acquiring the guide point on the camera; and moving the measurement arrangement to the cutting point for acquiring the cutting point on the camera. The process further includes the steps of determining the effective tool diameter D by determining the distance travelled by the measurement slide between the guide point and the cutting point; determining the effective tilt angle α by acquiring the tilt angle on the camera; converting the effective tilt angle α into an effective tilt diameter D1; adjusting the effective tool diameter D to the stipulated tool diameter; and adjusting the effective tilt angle α to the stipulated tilt angle by adjusting the effective tilt diameter D1 to a stipulated tilt diameter.

8 Claims, 1 Drawing Sheet

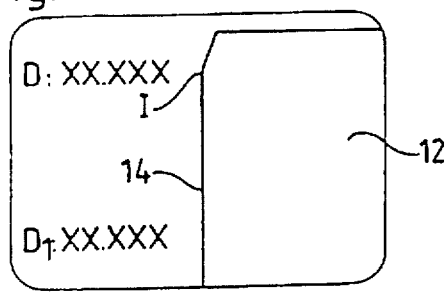
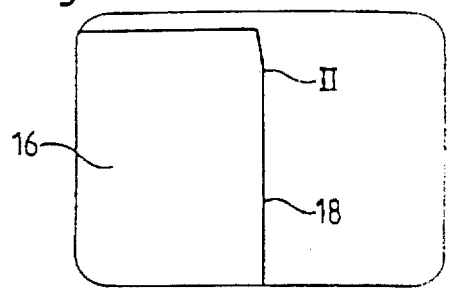
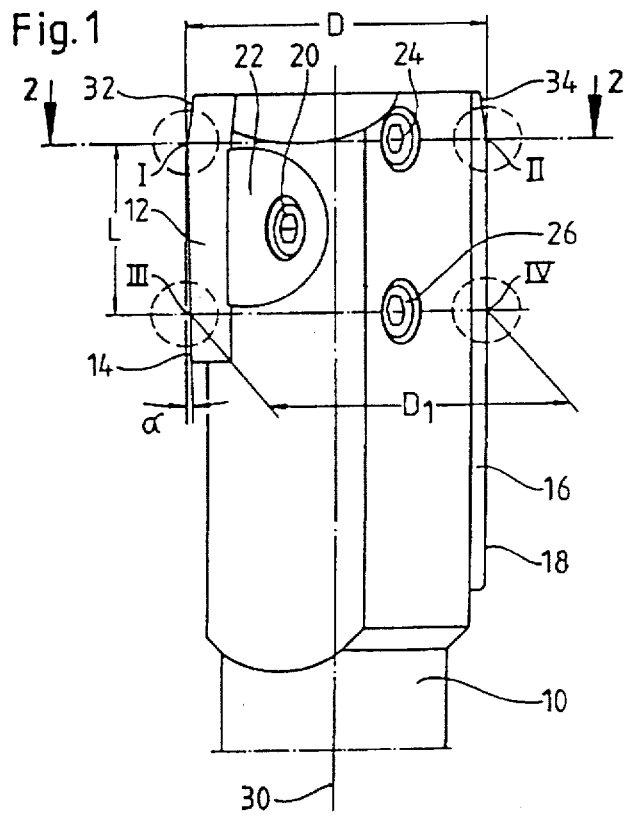
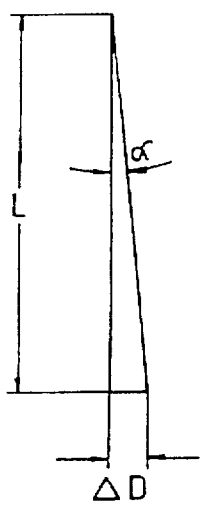
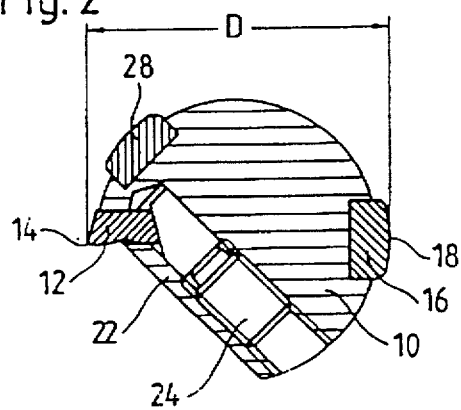

PROCESS AND DEVICE FOR ADJUSTING REAMERS AND THE LIKE

FIELD OF THE INVENTION

The invention relates to a process for adjusting the diameter of reamers and similar cutting tools, in which the reamer is clamped in a toolholder mounted on a coordinate slide, and is measured using a camera-equipped measurement means which can be traversed with a measurement slide with respect to the diameter brought into the focal plane between the cutting edge and the opposite guide line of the shaft as well as the tilt of the cutting edge, by the individual measuring points being acquired by the camera, the traverse paths of the measurement slide between the measurement points being determined, and the cutting blade being adjusted according to the measurement result.

The invention moreover relates to a device for executing this process.

BACKGROUND OF THE INVENTION

In metal cutting, to produce precision holes with close production tolerances, special cutting tools, especially so-called reamers, are used, with a cutting blade which is attached to the shaft to be interchangeable and adjustable. These cutting blades must be adjusted to a stipulated diameter after changing and before each new use. Usually the cutting blades are also tilted slightly radially to the inside against the feed direction to prevent material accumulation at the cutting inlet. The cutting blades are adjusted using set screws provided on the tool shaft or the like, and there is at least one locking screw for fixing the cutting blade in position.

Various mechanical measurement means are known which can be used to acquire the effective diameter of reamers and the aforementioned angle of tilt of the cutting blade with high precision using probes and dial gauges. However, mechanical measurement has the disadvantage that the sensitive cutting blade can be damaged by mechanical contact. On the other hand, handling of mechanical probes and dial gauges is extraordinarily difficult and time-consuming due to the three-dimensional closeness which usually prevails. Likewise, retrofitting onto other tool sizes is very time consuming.

Another known process for adjustment of cutting tools on which this invention is based uses a means with two coordinate slides on which on the one hand the tool and on the other a camera are mounted. By moving the slides, the plane of the diameter which is determined by the cutting edge of the tool is moved into the focal plane of the camera. At this point, in succession, the cutting edge on the one hand and the guide line which is opposite on the shaft are brought on a monitor which is joined to the camera into a stipulated reference position to the camera and the traverse path between the cutting edge and the guide line is ascertained via precise scales. This traverse path corresponds to the effective diameter of the cutting tool. The adjustment process can also be followed on the monitor until the desired size is reached. The disadvantage of this solution is that only one measurement point at a time can be acquired with the camera and the next measurement point requires that the coordinate or measurement slide be traversed each time, so that under certain circumstances it is necessary to move back and forth several times until both the desired diameter as well as the desired angle of tilt of the cutting edge is reached. Due to the necessity of repeatedly moving back and forth not only is time consumption for the adjustment process relatively high, but inaccuracies can also occur.

SUMMARY OF THE INVENTION

The object of the present invention is to develop the generic process and a generic measurement means equipped with a camera and a monitor for executing the process such that the measurement process can be implemented relatively easily with high precision.

This object is achieved according to the invention by a process of the aforementioned type which is characterized in that first the guide line of the reamer opposite the cutting edge is acquired with the camera and is fixed as the reference position (position II). The measurement slide which holds the camera is moved until the position (position I) of the cutting edge which determines the diameter is acquired by the camera. The path traversed by the measurement slide between the two measurement positions (position II, position I) is ascertained. The tilt of the cutting edge against the vertical or a corresponding axially parallel line is acquired via the camera and is converted by a computer connected to it into diameter D1 in a position (position III) which is offset on the cutting edge. Effective diameter (D) and diameter (D1), which determine the tilt of the cutting blade, are set on to the stipulated values.

It is therefore only necessary to acquire the rear-side guide line on the shaft with the camera and to a certain extent set it to zero and then while simultaneously determining the traverse path, to bring the cutting edge into the corresponding position on the monitor. It is not necessary to additionally move back and forth. The tilt angle of the cutting edge is acquired using the camera and is converted by the computer via the tan-function into a diameter which is at a distance from the tool diameter which is authoritative for the hole size. Both diameter sizes can be inserted into the monitor and followed during the adjustment process until the respective desired sizes are reached.

Before performing the actual measurement process, first the diameter plane determined by the cutting blade is brought into the focal plane of the camera by traversing the tool using the coordinate slide which holds it and turning the tool in the coordinate slide until a sharp image of the diameter appears on the monitor. Since cameras of this type have a very low depth of field, even small tilts are visible. When the desired position in the focal plane is reached, the coordinate slide which carries the tool is fixed in position. The subsequent traverse processes are carried out using the coordinate slide which holds the camera, in this connection also called the measurement slide. It is however also possible to fix the measurement slide with the camera and to execute the traverse processes using the coordinate slide of the tool.

In practice it can occur that the shaft of the tool is not completely straight in the toolholder. This would lead to determination, not of the exact diameter, but a somewhat longer dimension which runs obliquely through the shaft, in the measurement process. Therefore preferably there is also a step in which the camera, simultaneously with acquisition of the position (position II) of the backward guide line of the shaft, acquires some tilt of this guide line, and that the ascertained tilt angle is used in the subsequent determination of the traverse path via a cos-function to compute back the measured traverse path.

BRIEF DESCRIPTION OF THE DRAWINGS

Various, embodiments of the invention as shown in the attached drawings.

FIG. 1 shows one view of a cutting tool adjusted according to the invention with a shaft, a cutting blade, two set screws and one locking screw;

FIG. 2 shows a section along line 2—2 in FIG. 1;

FIG. 3 shows the camera picture of the cutting blade with measurement position I;

FIG. 4 shows the camera picture of the backward guide line of the shaft with measurement point II;

FIG. 5 illustrates the tilt of the cutting blade in an enlarged representation.

FIG. 1 shows shaft 10 of a cutting tool to be adjusted according to the invention, to which cutting blade 12 is attached.

DETAILED DESCRIPTION OF THE INVENTION

As follows especially from FIG. 2, diametrically opposite the cutting edge of the cutting blade (edge labelled 14), there is a guide strip 16 which runs along one surface line of the shaft and which is partially sunk into shaft 10; its peak line is exactly opposite cutting edge 14 and in this connection will be called guide line 18.

Cutting blade 12 is held on the shaft using locking screw 20 and clamp plate 22. Two set screws 24 and 26 allow cutting blade 12 to be pushed to the left and right in FIGS. 1 and 2 after locking screw 20 is loosened, and since they lie on top of one another at a distance, also adjustment of the tilt of cutting blade 12 with reference to the vertical in FIG. 1.

To capture the reaction forces exerted in the peripheral direction on the shaft by cutting blade 12, in the direction of rotation behind cutting tool 12 there is another guide strip 28 which however is unimportant in this connection.

As follows from FIG. 1, cutting edge 14 does not run exactly parallel to axis of rotation 30 of shaft 10. Rather, first of all, on the top end in FIG. 1 there is section 32 which tapers to the top and which facilitates entry into a hole. This section ends in a cutting position or, position I, which is in cutting plane 2—2 of FIG. 2. From here cutting edge 14 continues to run back slightly with a very acute angle α (FIG. 5) toward axis of rotation 30. Guide strip 16 also has upper section 34 which is tapered towards the top end of the tool, and only at the guide position at the point labelled II which likewise lies in cutting plane 2—2 does guide strip 16 attain the size which is authoritative for the diameter. Diameter D which is taken in cutting plane 2—2 is therefore the effective tool diameter which is definitive for the size of the drill hole.

For a machining process, generally not only this diameter D, but also the tilt angle α stipulated, by which excess material accumulation and reaction pressure are prevented in the rear areas of the cutting edge. In addition to diameter D, therefore the tilt angle α must also be set in an adjustment process. According to the invention this is done, not directly by angle adjustment, but by the fact that at a distance L parallel to the axis of rotation of shaft 10 another diameter D1, the tilt diameter is determined which is computed according to the following relations using the tan-function of angle α.

$$D1 = D - \Delta D$$
$$\Delta D = L \cdot \tan \alpha$$

Conversion of angle α into diameter D1 takes into account the circumstances of practice. Theoretically it would also be possible to directly set and display tilt angle α. Since it is a very small angle, it would be poorly descriptive. Therefore in practice it would be much preferable if the tilt be defined by the length dimension, here therefore the distance L between the positions of the two diameters D and D1, and the change of length of the diameter over segment L from D to D1.

In this example the plane of diameter D1 runs through lower set screw 26 so that rotation of this lower set screw 26 directly causes re-adjustment of diameter D1. The position of cutting edge 14 in the plane determined by diameter D1 or lower set screw 26 has been labelled III in FIG. 1 corresponds to a tilt position.

At this point implementation of the process according to the invention will be detailed.

First of all, the camera, which is not shown, is traversed with the pertinent coordinate slide to measurement point I on the cutting edge. Precise focussing of cutting blade 12 to the focal plane of the camera is checked and established by the fact that the tool is turned in the toolholder or traversed with the pertinent coordinate slide. As soon as a sharp image of cutting blade 12 or the edge area of the cutting blade is established, it can be assumed that the desired diameter D (adjustment diameter) is in the focal plane of the camera. On the monitor joined to the camera the image of the cutting blade shown in FIG. 3 appears.

At this point the tool slide and toolholder are stopped so that the found tool position is preserved. The coordinate slide (measurement slide) which is not shown and which holds the camera is traversed toward the back of the tool which is on the right in FIGS. 1 and 2 until guide line 18 is acquired. On the monitor appears the image shown in FIG. 4. The position of the camera is "zeroed" with reference to guide line 18, therefore for example traversed such that guide line 18 coincides with a mark which is provided on the monitor. The now found position forms the starting point for subsequent measurement of diameter D.

For this reason the measurement slide which carries the camera is traversed back into the position shown in FIG. 3 in which in turn measurement position I is assumed. The path traversed between measurement position II (FIG. 4) and I (FIG. 3) corresponds exactly to the current effective diameter of the tool. The traverse distance, i.e., diameter D, is inserted top left into the monitor according to FIG. 3. During the now following adjustment process, the camera remains aligned to the cutting blade and the picture shown in FIG. 3 continues to appear on the monitor. The changes of the values of D and D1 during the adjustment process can therefore be continually followed on the monitor. By turning the set screws 24, 26 the desired diameter D can be produced.

At the same time, however the above described diameter D1 should be adjusted according to the tilt angle α of the cutting edge. For this reason the camera acquires the tilt angle α of the cutting edge and the latter is converted into desired diameter D1 according to the aforementioned equations. The respective value of D1 is inserted bottom left into the monitor picture according to FIG. 3. If by actuating set screws 24, 26 both the size of D and also the size of D1 are changed such that on the monitor the corresponding values appear, the adjustment process is completed. The cutting blade is fixed in position using locking screw 20.

Therefore only one traverse path from position II to position I is necessary. Adjustment of position III (diameter D1) is achieved without the need to move the slide of the camera again. In particular, it is unnecessary to move repeatedly back and forth between points I, II, and III, as is the case in the prior art so that the time consumption associated with it and the resulting inaccuracies are eliminated.

This process however presupposes that shaft 10 is held completely straight in the toolholder. But in practice it is quite common that either the tool holder or the tool shaft undergoes an impact due to the preceding loads. In this case the camera in position II on the back of the shaft determines the tilt of the shaft and the computer computes back the traverse path between points II and I according to a suitable function of this angle. The corresponding also applies to determination of diameter D1.

The special advantage of the invention consists in that after returning the camera to position D1 of the cutting edge both diameter D and diameter D1 can be set without additional camera movements and that the cutting edge with position I always remains visible on the monitor during these movements. A subsequent check can still be done without a traverse motion even after completion of the adjustment process and tightening of locking screw 20, or a shift of the values can be corrected by tightening the locking screw.

If the edge of the cutting blade which runs between diameter D and diameter D1 does not form a straight line and thus is not reliably acquired via the camera as the tilt α of the cutting edge, in addition before approaching measurement points II and I measurement points III and IV are approached to fix the current diameter D1. The difference determined between D1 and D is ascertained as the tilt and interpolated as a straight cutting edge. This makes it possible to set effective diameter D and diameter D1 which determines the tilt of the cutting blade in the above described manner even for crowned and concave cutting edges.

I claim:

1. A process for adjusting an effective tool diameter D and an effective tilt angle α of a cutting tool to a stipulated tool diameter and a stipulated tilt angle, respectively, the cutting tool including a shaft, a cutting blade disposed on the shaft and defining a cutting point and a cutting edge tilted by the effective tilt angle with respect to a rotational axis of the shaft, and a guide element disposed on the shaft opposite the cutting blade and defining a guide point and a guide line, the cutting point of the cutting blade and the guide point of the guide element being disposed on a cutting plane of the cutting tool, the process comprising the steps of:

clamping the cutting tool in a toolholder mounted on a coordinate slide;

utilizing a camera-equipped measurement arrangement including a camera, a measurement slide supporting the camera, and a computer connected to the camera;

traversing a distance with the measurement arrangement between the guide point and the cutting point, including the steps of:

moving the measurement slide and the camera thereon to the guide point for acquiring the guide point on the camera;

fixing the guide point as a zero reference position II on the measurement arrangement; and moving the measurement slide and the camera thereon to the cutting point as a measurement position I for acquiring the cutting point on the camera;

determining the effective tool diameter D by determining the distance travelled by the measurement slide between the guide point and the cutting point;

determining the effective tilt angle α utilizing the measurement arrangement by acquiring the tilt angle on the camera;

converting the effective tilt angle α into an effective tilt diameter D1 defined in a direction parallel to the effective tool diameter D at predetermined distance L from the cutting plane measured in a direction parallel to the rotational axis of the shaft;

adjusting the effective tool diameter D to the stipulated tool diameter by manipulating the cutting tool; and adjusting the effective tilt angle α to the stipulated tilt angle by adjusting the effective tilt diameter D1 to a stipulated tilt diameter.

2. The process according to claim 1, further comprising the step of bringing the cutting plane into a focal plane of the camera by shifting and turning one of the cutting tool and the camera with respect to one another such that the cutting blade is sharply imaged on the camera.

3. The process according to claim 1, further comprising the steps of:

determining a tilt angle of the shaft with respect to the measurement slide utilizing the measurement arrangement by acquiring the tilt angle of the shaft on the camera, the step of determining the effective tool diameter including the step of calculating the effective tool diameter with both the tilt angle of the shaft and the distance travelled by the measurement slide between the guide point and the cutting point.

4. The process according to claim 1, wherein the guide point is a first guide point, the process further comprising the steps of:

moving the measurement slide and the camera thereon to a second guide point located on the guide element at the distance L below the cutting point measured in the direction parallel to the rotational axis of the shaft;

fixing the second guide point as a zero reference position IV on the measurement arrangement;

moving the measurement slide and the camera thereon to a tilt point as a measurement position III for acquiring the tilt point on the camera, the tilt point being located on the cutting edge at the distance L below the cutting point measured in the direction parallel to the rotational axis of the shaft;

determining the effective tilt diameter D1 by determining the distance travelled by the measurement slide between the second guide point and the tilt point.

5. The process according to claim 2, further comprising the steps of:

determining a tilt angle of the shaft with respect to the measurement slide utilizing the measurement arrangement by acquiring the tilt angle of the shaft on the camera, the step of determining the effective tool diameter including the step of calculating the effective tool diameter with both the tilt angle of the shaft and the distance travelled by the measurement slide between the guide point and the cutting point.

6. The process according to claim 2, wherein the guide point is a first guide point, the process further comprising the steps of:

moving the measurement slide and the camera thereon to a second guide point located on the guide element at the distance L below the cutting point measured in the direction parallel to the rotational axis of the shaft;

fixing the second guide point as a zero reference position IV on the measurement arrangement;

moving the measurement slide and the camera thereon to a tilt point as a measurement position III for acquiring the tilt point on the camera, the tilt point being located on the cutting edge at the distance L below the cutting point measured in the direction parallel to the rotational axis of the shaft;

determining the effective tilt diameter D1 by determining the distance travelled by the measurement slide between the second guide point and the tilt point.

7. The process according to claim 3, wherein the guide point is a first guide point, the process further comprising the steps of:

moving the measurement slide and the camera thereon to a second guide point located on the guide element at the distance L below the cutting point measured in the direction parallel to the rotational axis of the shaft;

fixing the second guide point as a zero reference position IV on the measurement arrangement;

moving the measurement slide and the camera thereon to a tilt point as a measurement position III for acquiring the tilt point on the camera, the tilt point being located on the cutting edge at the distance L below the cutting point measured in the direction parallel to the rotational axis of the shaft;

determining the effective tilt diameter D1 by determining the distance travelled by the measurement slide between the second guide point and the tilt point.

8. The process according to claim 5, wherein the guide point is a first guide point, the process further comprising the steps of:

moving the measurement slide and the camera thereon to a second guide point located on the guide element at the distance L below the cutting point measured in the direction parallel to the rotational axis of the shaft;

fixing the second guide point as a zero reference position IV on the measurement arrangement;

moving the measurement slide and the camera thereon to a tilt point as a measurement position III for acquiring the tilt point on the camera, the tilt point being located on the cutting edge at the distance L below the cutting point measured in the direction parallel to the rotational axis of the shaft;

determining the effective tilt diameter D1 by determining the distance travelled by the measurement slide between the second guide point and the tilt point.

* * * * *